United States Patent
Arnold et al.

(10) Patent No.: US 6,935,701 B1
(45) Date of Patent: Aug. 30, 2005

(54) ARTICULATING LOCK ADJUSTABLE TURNING LOOP

(75) Inventors: David R. Arnold, Macomb, MI (US); Richard Boelstler, Lake Orion, MI (US); Robert J. Desmarais, Lake Orion, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 2 days.

(21) Appl. No.: 10/792,776

(22) Filed: Mar. 5, 2004

(51) Int. Cl.[7] .......................... B60R 22/20; B60R 22/06
(52) U.S. Cl. ................... 297/473; 280/801.2; 280/804; 280/808
(58) Field of Search ..................... 297/473; 280/801.2, 280/804, 808

(56) References Cited

U.S. PATENT DOCUMENTS

| | | | |
|---|---|---|---|
| 4,042,264 A | | 8/1977 | Shumer |
| 4,607,863 A | * | 8/1986 | Yokote ........................ 280/804 |
| 4,926,722 A | | 5/1990 | Sorenson et al. |
| 5,009,134 A | | 4/1991 | Sorenson et al. |
| 5,022,137 A | | 6/1991 | Sorenson et al. |
| 5,050,907 A | | 9/1991 | Boumarafi et al. |
| 5,102,165 A | * | 4/1992 | Araki et al. ................. 280/804 |
| 5,163,707 A | * | 11/1992 | Watanabe et al. ......... 280/801.2 |
| 5,205,589 A | * | 4/1993 | Watanabe .................... 280/804 |
| 5,230,534 A | | 7/1993 | Boumarafi et al. |
| 5,332,290 A | * | 7/1994 | Borlinghaus et al. ....... 297/473 |
| 5,601,311 A | | 2/1997 | Pfeiffer et al. |
| 5,692,780 A | * | 12/1997 | Yasui ....................... 280/801.2 |
| 2003/0209899 A1 | * | 11/2003 | Arnold et al. ........... 280/801.2 |
| 2005/0023815 A1 | * | 2/2005 | Hoffmann et al. ....... 280/801.2 |

OTHER PUBLICATIONS

U.S. Appl. No. 10/408,622, filed Apr. 17, 2003, for "height adjuster or adjustable turning loop".

* cited by examiner

Primary Examiner—Rodney B. White
(74) Attorney, Agent, or Firm—Lonnie R. Drayer

(57) ABSTRACT

An adjustable turning loop for a vehicle comprises a rail and a slide for a web guide. The slide is slideably received on the rail. A lock maintains a slide at a position on the rail. The lock has a locked condition limiting movement of the slide on the rail and an unlocked condition allowing movement of the slide on the rail. The lock comprises a first member and a second member. The first member and the second member pivot relative to the rail. The first member and the second member engage the rail in the locked condition and disengage from the rail in the unlocked condition.

17 Claims, 4 Drawing Sheets

ARTICULATING LOCK ADJUSTABLE TURNING LOOP

FIELD OF THE INVENTION

This invention relates to an adjustable turning loop for a vehicle safety restraint system.

BACKGROUND OF THE INVENTION

A seat belt system is typically anchored to a vehicle at three different locations around a vehicle passenger. Two anchors support the lap belt portion of a seat belt while a third anchor, a loop or D-ring, located at the approximate height of the shoulder of the passenger provides support for the shoulder belt portion of the seat belt. Due to varying sizes of passengers, manufacturers use assemblies known as adjustable turning loops, which allow the shoulder loop to be adjusted up or down to accommodate these differing heights. Existing adjustable turning loops typically comprise a slide that mounts the D-ring to a rail, which is attached to the B pillar of the vehicle. The slide may be adjusted up or down by lifting or pressing an actuator, which releases a lock that holds the slide in place. The locking mechanism is frequently very complex and expensive to manufacturer and assemble. A need therefore exists for a simplified locking mechanism for an adjustable turning loop.

SUMMARY OF THE INVENTION

The present invention comprises an adjustable turning loop for a seat belt web guide. The adjustable turning loop has a rail and a slide slideably received on the rail. The slide mounts a D-ring. Like existing adjustable turning loops, the invention has a lock for maintaining the slide at a position on the rail. The lock has a locked condition limiting movement of the slide on the rail and an unlocked condition allowing movement of the slide on the rail. The lock is greatly simplified from existing structures. The lock comprises a first member and a second member. The first member and the second member pivot relative to the rail and engage the rail in the locked condition and disengage from the rail in the unlocked condition.

The first member and the second member are in contact with the rail in the locked condition. The rail has teeth for engaging the first and second members. The first member and the second member have edges that engage these teeth in the locked condition. To promote the secure locking of the slide on the rail, the first member is biased to pivot against the rail in a clockwise direction while the second member is biased to pivot against the rail in a counterclockwise direction. In this way, the slide is secured along two different directions. The first member and the second member may comprise a loop that extends around the rail. Both the first member and the second member may be biased in the locked condition. A spring may be used to bias the first and second members in this locked condition. Furthermore, a securing member that secures the web guide to the slider may form a pivot point for the first member and the second member.

BRIEF DESCRIPTION OF THE DRAWINGS

The various features and advantages of this invention will become apparent to those skilled in the art from the following detailed description of the currently preferred embodiment.

DETAILED DESCRIPTION OF THE INVENTION

Figure 1:
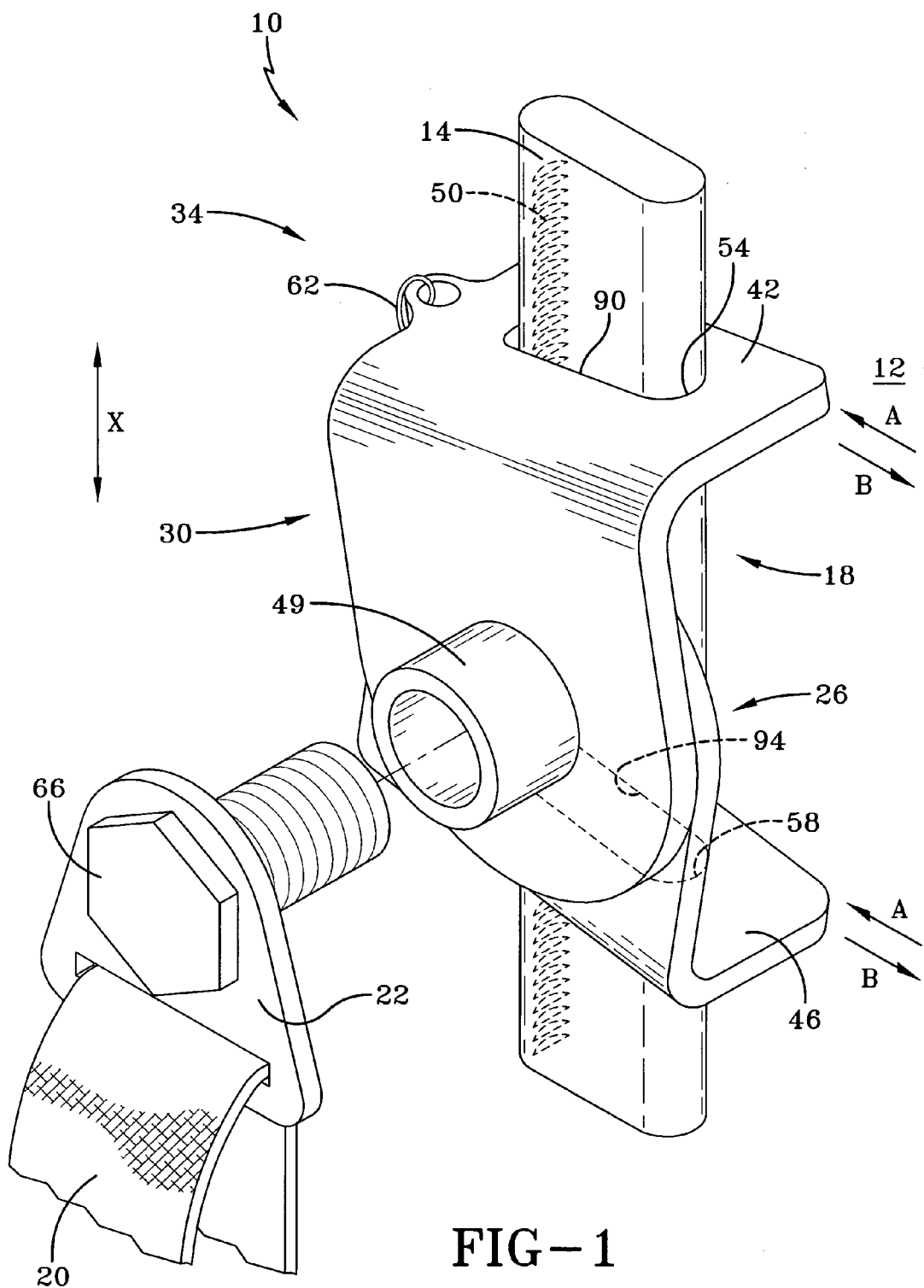
FIG. 1 is a view of the inventive adjustable turning loop, illustrating rail, slide and D-ring.
Figure 3:
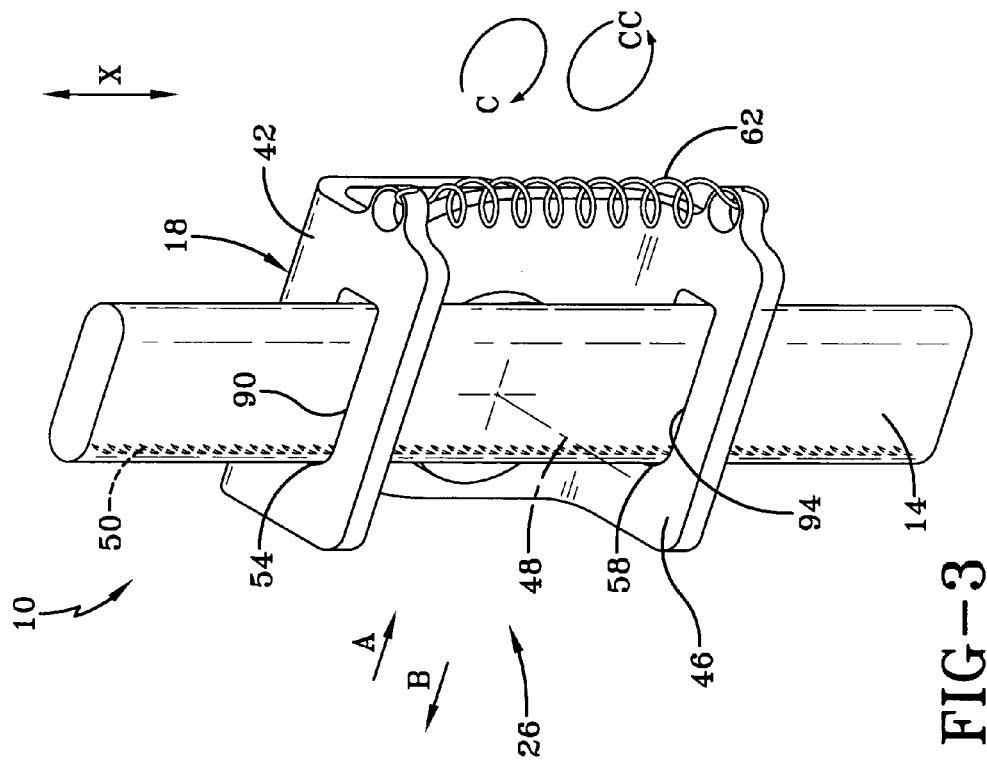
FIG. 3 illustrates the actuator of FIG. 2 in the unlocked condition.
Figure 2:
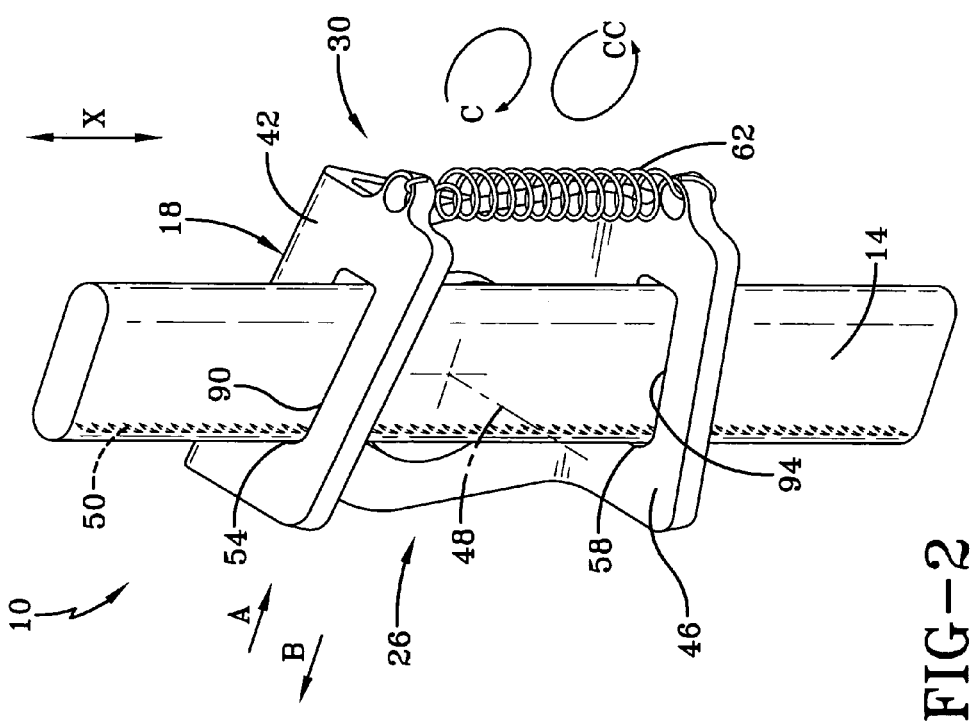
FIG. 2 is a reverse view of the actuator of FIG. 1 in the locked condition.
Figure 4:
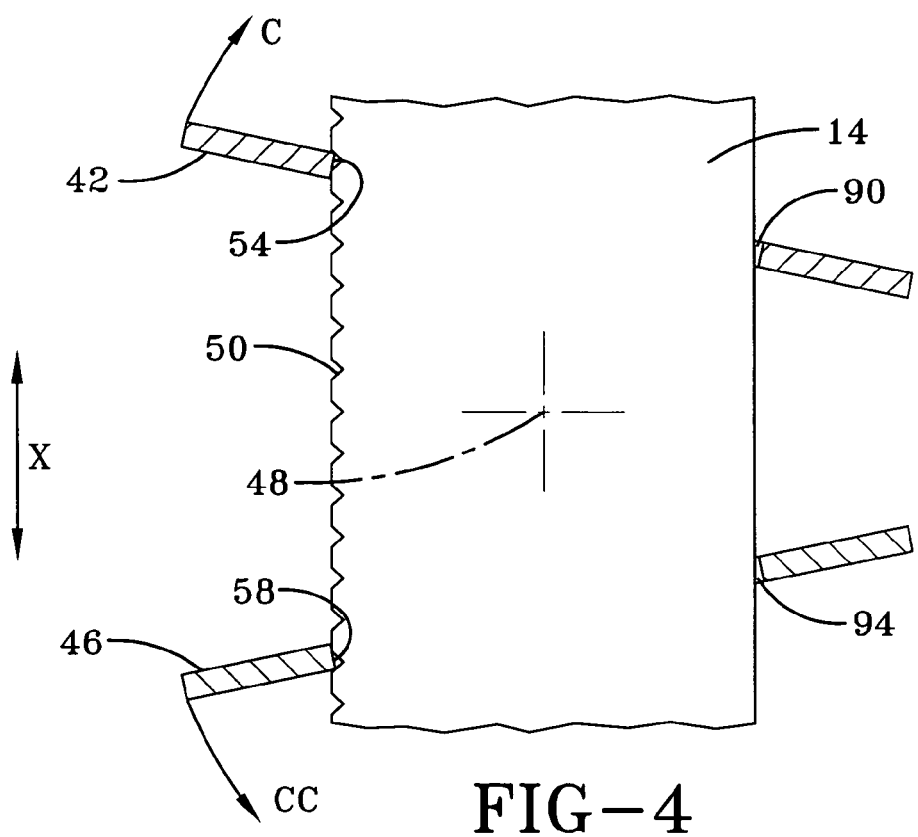
FIG. 4 illustrates a cross-sectional view of the first and second members in the locked condition.

FIG. 1 illustrates an adjustable turning loop or height adjuster 10 for a set belt web guide 22 comprising a rail 14 and a slide 18. As shown, the web guide 22 is a D-ring secured to the slide 18 by a securing member 66, here a bolt. The slide 18 receives the rail 14 through a pair of holes 90, 94. In contrast to other adjustable turning loops, the height adjuster 10 has very few components to lock the slide 18 in place at a selected position 30. Specifically, as shown in FIGS. 2 and 4, the slide 18 has an actuator 26 for locking and unlocking the slide 18 on the rail 14. The actuator 26 has a first loop 42 and a second loop 46, which receive the rail 14 through the pair of holes 90, 94, respectively. In the locked position shown in FIG. 4, the first loop 42 and the second loop 46 engage the teeth 50 of the rail 14 when locked. The first loop 42 has a first edge 54, which engages the teeth 50, while the second loop 46 has a second edge 58, which also engages the teeth 50.

Preferably, the rail 14 is oval in shape to accommodate shape of the loops 42, 46. The first loop 42 and the second loop 46 may be steel stampings. The rail 14 may be made of steel and roll formed with additional steps taken to form any needed holes or bends.

The first loop 42 is pivotally connected to the second loop 46 at a pivot point 48, the center of a nut 49, which is preferably the location for receiving the securing member 66 shown in FIG. 1. As shown in FIG. 2, a spring 62 is connected to the first loop 42 and second loop 46. The spring 62 is biased to pivot the first loop 42 in a clockwise direction and the second loop 46 in a counterclockwise direction, both directions are into the rail 14 as shown in FIG. 4. In this way, the height adjuster 10 is locked at two different locations along the X-axis. Moreover, because the first loop 42 and second loop 46 are biased to pivot in opposite directions, the slide 18 is secured along the X-axis along two different directions.

Figure 5:
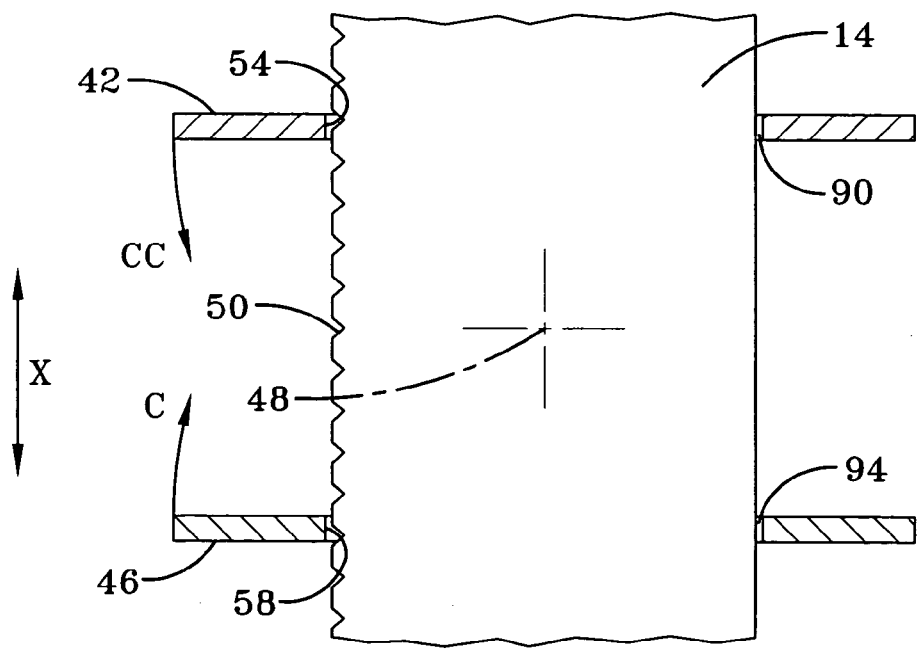
FIG. 5 illustrates the first and second members of FIG. 4 in the unlocked condition.

To unlock the slide 18 for movement along the rail 14, an actuator 26 is pressed in the direction of arrow A from the locked position shown in FIG. 2. As shown in FIG. 5, the first loop 42 moves in a counterclockwise direction to disengage the first edge 54 from the teeth 50 while the second loop 46 moves in a clockwise direction to disengage the second edge 58 from the teeth 50. Consequently, the first loop 42 and second loop 46 no longer engage the teeth 50 of the rail 14. The rail 14 is free to move through the pair of holes 90, 94. Preferably, the actuator 26 is oriented so that in the event of a crash the seat belt 20 pulls along the direction of arrow B to reinforce locking rather than unlocking.

Figure 6:
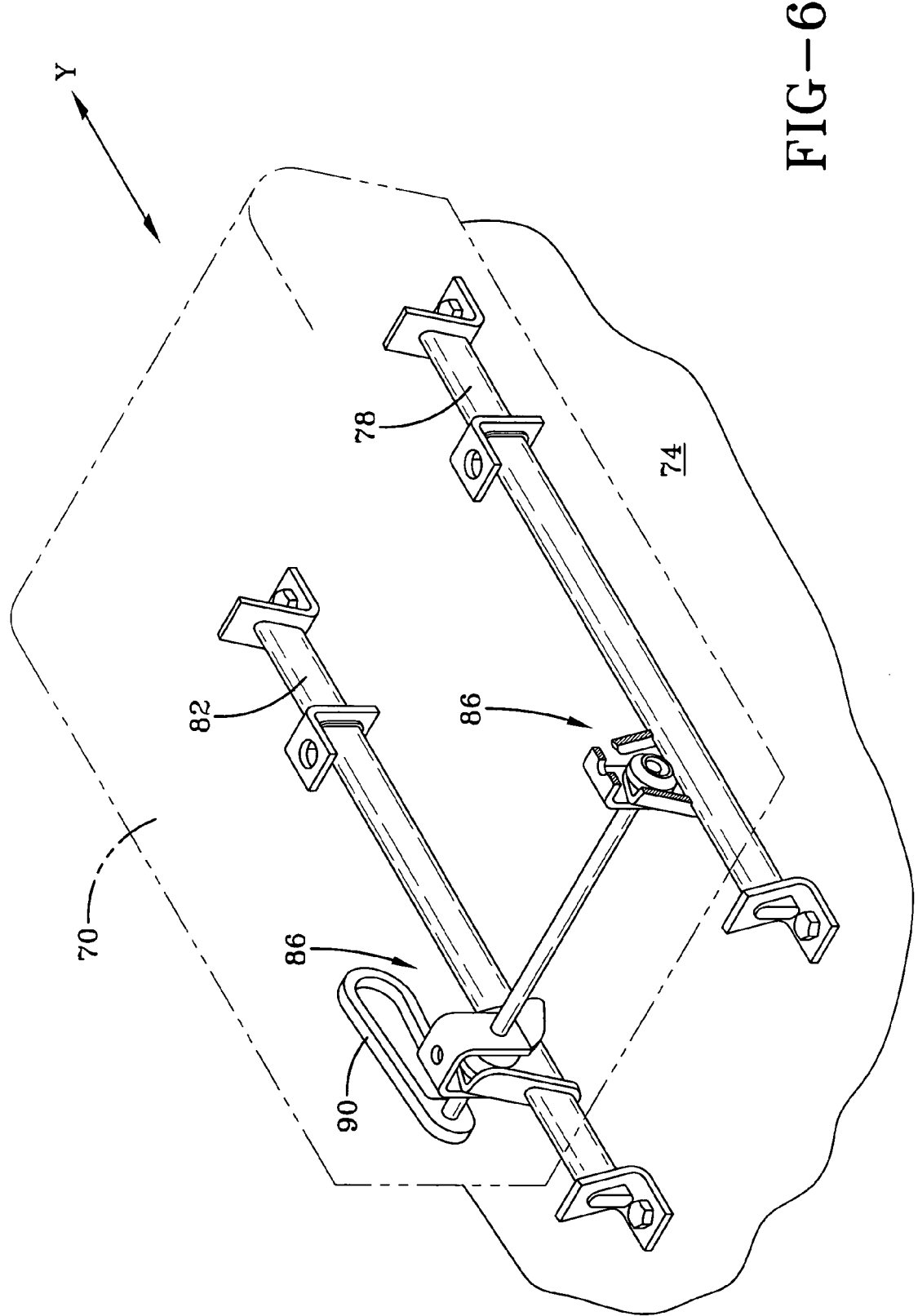
FIG. 6 illustrates a seat assembly using the inventive locking mechanism of the previous figures.

The actuator 26 of the height adjuster 10 need not be limited for use with adjustable turning loops. As shown in FIG. 6, other vehicle components may benefit from such a simplified locking mechanism. FIG. 6 illustrates a vehicle seat 70, which is slideably received on a first rail 78 and a second rail 82. The first rail 78 and second rail 82 are both mounted to a vehicle floor 74 as shown. A vehicle seat 70 may be slideably moved along the Y-axis. To lock the seat 70 in place with respect to the first rail 78 and second rail 82, locking mechanisms 86 may be employed on each rail. The locking mechanisms 86 are constructed in the same fashion as a locking mechanism of FIG. 1. A handle 90 may be used to lock and unlock the locking mechanisms 86 through known linkages.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A height adjuster for a seat belt web guide comprising:
a rail;
a slide for a web guide, said slide slideably received on said rail;
an actuator, said actuator having a first member and a second member for maintaining said slide at a position on said rail, said actuator having a locked condition limiting movement of said slide on said rail and an unlocked condition allowing movement of said slide on said rail;
a securing member, said securing member securing said web guide to said slide and being a pivot point about which said first member and second member pivots; and
wherein said first member and said second member engaged with said rail in said locked condition and disengaged from said rail in said unlocked condition wherein said first member is rotatably pivotable about an axis of said securing member and biased to pivot against said rail in a clockwise direction and said second member is rotatable about an axis of said securing member and biased to pivot against said rail.

2. The height adjuster for a seat belt web guide of claim 1 wherein said first member and said second member are in contact with said rail in said locked condition.

3. The height adjuster for a seat belt web guide of claim 2 wherein said rail has teeth for engaging said first member and said second member.

4. The height adjuster for a seat belt web guide of claim 3 wherein said first member has a first edge and said second member has a second edge, said first edge and said second edge engaged with said teeth in said locked condition.

5. The height adjuster for a seat belt web guide of claim 1 wherein said first member is biased to pivot against said rail in a clockwise direction and said second member is biased to pivot against said rail in a counterclockwise direction.

6. The height adjuster for a seat belt web guide of claim 1 wherein at least one of said first member and said second member comprises a loop, said rail disposed in said loop.

7. The height adjuster for a seat belt web guide of claim 1 wherein said first member and said second member are biased in said locked condition.

8. The height adjuster for a seat belt web guide of claim 5 including a spring for biasing said first member and said second member to be in said locked condition.

9. A height adjuster for a seat belt web guide comprising:
a rail;
a slide for a web guide, said slide slideably received on said rail;
a securing member, said securing member securing said web guide to said slide;
an actuator for maintaining said slide at a position on said rail, said actuator having a locked condition limiting movement of said slide on said rail and an unlocked condition allowing movement of said slide on said rail;
said actuator comprises a first loop and a second loop, said first loop and said second loop being rotatable pivotable about an axis of said securing member, said rail disposed in said first loop and said second loop and pivotable relative to said first loop and said second loop; and
wherein said first loop has a first edge and said second loop has a second edge, said first edge and said second edge engaged with said rail in said locked condition and disengaged from said rail in said unlocked condition.

10. The height adjuster for a seat belt web guide of claim 9 wherein said rail has teeth for engaging said first edge of said first loop and said second edge of said second loop.

11. The height adjuster for a seat belt web guide of claim 9 wherein said first loop is biased to pivot against said rail in a clockwise direction and said second loop is biased to pivot against said rail in a counterclockwise direction.

12. The height adjuster for a seat belt web guide of claim 9 wherein said first loop and said second loop are biased in said locked condition.

13. The height adjuster for a seat belt web guide of claim 9 including a spring for biasing said first loop and said second loop to be in said locked condition.

14. A locking mechanism for a vehicle component comprising:
one or more rails for attachment to a vehicle body;
one or more slides for movably mounting a seat belt web guide or a vehicle seat, each slide slideably received on a rail;
a securing member, said securing member securing said web guide or vehicle seat to each slide;
one or more actuators for maintaining said slide at a position on said rail, each actuator having a locked condition limiting movement of said slide on said rail and said unlocked condition allowing movement of said slide on said rail; and
each of said actuators comprising a first member and a second member, said first member and said second member each being rotatable pivotable about an axis of said securing member and pivotable relative to said rail, said first member and said second member engaged with said rail in said locked condition and disengaged from said rail in said unlocked condition.

15. The locking mechanism for a vehicle component of claim 14 wherein at least one of said first member and said second member comprises a loop, said rail disposed in said loop.

16. The locking mechanism for a vehicle component of claim 14 wherein said vehicle component comprises a web guide for a seat belt.

17. The locking mechanism for a vehicle component of claim 14 wherein said vehicle component comprises a vehicle seat.

* * * * *